(12) United States Patent
Berger

(10) Patent No.: US 12,345,219 B2
(45) Date of Patent: Jul. 1, 2025

(54) COATING SYSTEM FOR REFRACTORY METALS

(71) Applicant: Hitemco, LLC, Old Bethpage, NY (US)

(72) Inventor: Charles Clifford Berger, New City, NY (US)

(73) Assignee: Hitemco, LLC, Old Bethpage, NY (US)

( * ) Notice: Subject to any disclaimer, the term of this patent is extended or adjusted under 35 U.S.C. 154(b) by 1271 days.

(21) Appl. No.: 16/057,047

(22) Filed: Aug. 7, 2018

(65) Prior Publication Data

US 2019/0040817 A1   Feb. 7, 2019

Related U.S. Application Data

(60) Provisional application No. 62/542,134, filed on Aug. 7, 2017.

(51) Int. Cl.
F02K 9/97         (2006.01)

(52) U.S. Cl.
CPC .......... *F02K 9/974* (2013.01); *F05D 2230/90* (2013.01); *F05D 2300/13* (2013.01); *F05D 2300/173* (2013.01); *F05D 2300/2112* (2013.01); *F05D 2300/611* (2013.01)

(58) Field of Classification Search
CPC ...................................... F02K 9/974
See application file for complete search history.

(56) References Cited

U.S. PATENT DOCUMENTS

| | | | |
|---|---|---|---|
| 3,257,230 A | | 6/1966 | Wachtell et al. |
| 5,613,299 A | * | 3/1997 | Ring ............. B23P 15/008 29/523 |
| 5,866,271 A | * | 2/1999 | Stueber ............ C23C 28/00 148/240 |
| 5,912,087 A | | 6/1999 | Jackson et al. |
| 6,045,863 A | * | 4/2000 | Olson ............. C23C 10/04 427/142 |
| 6,164,060 A | * | 12/2000 | Myers ............. F02K 9/62 60/253 |
| 6,287,644 B1 | | 9/2001 | Jackson et al. |

(Continued)

OTHER PUBLICATIONS

Majumdar et al., Deposition of aluminide and silicide based protective coatings on niobium, Applied Surface Science, vol. 257, Jul. 24, 2010, pp. 635-640. (Year: 2010).*

(Continued)

*Primary Examiner* — Lorne E Meade
(74) *Attorney, Agent, or Firm* — Reising Ethington P.C.

(57) ABSTRACT

A coating system includes a diffusion coating on a refractory metal or refractory metal alloy. The coating can be applied to a component such as a rocket engine component that includes a substrate including the refractory metal and is useful to protect the substrate from high temperature oxidation. The diffusion coating process employs an activator that includes a compound of the metal to be diffused into the surface of the substrate and is a vapor phase process in which the vapor includes metal from the activator and additional from the metal source being activated. Aluminum trifluoride can be used to activate an aluminum metal source to form an aluminide coating on a refractory metal-based alloy, such as a niobium alloy.

20 Claims, 3 Drawing Sheets

(56) References Cited

U.S. PATENT DOCUMENTS

| | | | |
|---|---|---|---|
| 6,440,496 B1* | 8/2002 | Gupta | C23C 10/50 |
| | | | 427/252 |
| 6,447,932 B1* | 9/2002 | O'Hara | C23C 12/00 |
| | | | 428/610 |
| 6,485,845 B1 | 11/2002 | Wustman et al. | |
| 8,039,116 B2* | 10/2011 | Bewlay | C23C 30/00 |
| | | | 428/632 |
| 8,362,592 B2* | 1/2013 | He | C30B 29/42 |
| | | | 257/618 |
| 8,916,005 B2* | 12/2014 | Cavanaugh | C23C 10/60 |
| | | | 148/240 |
| 9,034,479 B2 | 5/2015 | Naggaraj et al. | |
| 2005/0266163 A1 | 12/2005 | Wortman et al. | |
| 2005/0287296 A1 | 12/2005 | Wadley et al. | |
| 2009/0042054 A1* | 2/2009 | Bewlay | C21D 1/09 |
| | | | 428/615 |
| 2010/0219509 A1* | 9/2010 | He | C30B 25/18 |
| | | | 257/618 |
| 2016/0215382 A1 | 1/2016 | Ridgeway | |
| 2016/0281205 A1 | 9/2016 | Strock | |
| 2016/0298222 A1 | 10/2016 | Meehan et al. | |
| 2017/0002452 A1 | 1/2017 | Bacos et al. | |
| 2017/0122560 A1 | 5/2017 | Nagaraj | |

OTHER PUBLICATIONS

Ghosh, G. and Olson, G.B., "Integrated design of Nb-based superalloys: Ab initio calculations, computational thermodynamics and kinetics, and experimental results", Acta Materialia, vol. 55, Elsevier Ltd., Mar. 23, 2007, pp. 3281-3303. (Year: 2007).*

Sato, Y. and Hara, M., "Reducing Effect of a Slight Amount of NaCl Vapor on Pest Oxidation of Ta-75%Al at High Temperature", Oxidation of Metals, Springer, 2016, pp. 39-49. (Year: 2016).*

Sun et al., "Oxidation resistance and mechanical characterization of silicide coatings on the Nb-18Ti-14Si-9Al alloy", International Journal of Refractory Metals & Hard Materials, vol. 69, Elsevier Ltd., Jul. 30, 2017, pp. 18-26. (Year: 2017).*

Hebda, John, and Wah Chang. "Niobium alloys and high temperature applications." Niobium science & technology: proceedings of Int'l Symposium Niobium. vol. 2001 [//web.archive.org/web/20081217080513/http://www.cbmm.com.br/portug/sources/techlib/science_techno/table_content/sub_3/images/pdfs/016.pdf] (Year: 2008).*

* cited by examiner

COATING SYSTEM FOR REFRACTORY METALS

TECHNICAL FIELD

This disclosure generally relates to coatings and surface treatments for engine components.

BACKGROUND

Certain engine components, particularly combustion engine components that are directly exposed to burning fuel during engine operation, must be made from materials with a very high melting point. Refractory metals have high melting points, but they are also susceptible to oxidation at the extreme temperatures associated with burning fuel. Oxidation-resistant coatings typically used on other types of metal components have proven unsuccessful on refractory metals. Specialized intermetallic coatings have been developed for refractory metals, such as fused disilicide or silicide overlay coatings, but techniques for producing such coatings are very limited. Some engine components, such as rocket engine nozzles for spacecraft launch vehicles, are simply too large or have geometries too complex to apply these types of specialty coatings with existing capable equipment. Ceramic coatings on refractory metals have generally met with failure due to high porosity and poor adhesion, due in part to thermal expansion mismatches. Attempts to use a metallic bonding layer between refractory metals and ceramic coatings have also failed due to oxidation of the bonding layer, which causes spalling of the ceramic coating.

SUMMARY

In accordance with one embodiment, an engine component has a surface in direct contact with engine combustion gases during engine operation. The engine component includes a substrate, a diffusion aluminide coating, and a ceramic-based thermal barrier coating. The substrate is formed from a substrate material having a refractory metal as the primary constituent. The diffusion aluminide coating is formed on the substrate and includes aluminum interdiffused with the substrate material. The ceramic-based thermal barrier coating is disposed over the diffusion aluminide coating and defines at least a portion of the surface that is in direct contact with engine combustion gases during engine operation.

In one or more embodiments, the engine component includes a thermally grown oxide layer disposed over the diffusion aluminide layer, and the thermal barrier coating is disposed on the thermally grown oxide layer.

In one or more embodiments, the engine component does not include a metal overlay coating between the substrate and the thermally grown oxide layer.

In one or more embodiments, the engine component includes an alumina layer formed on the diffusion aluminide coating and underlying the thermal barrier coating.

In one or more embodiments, the refractory metal is niobium.

In one or more embodiments, the diffusion aluminide coating has a thickness of 50 micrometers or greater.

In one or more embodiments, the diffusion aluminide coating includes at least two of the following intermetallic compounds: $RAl$, $RAl_2$ and $RAl_3$, where R is the refractory metal.

In one or more embodiments, a rocket engine includes a nozzle through which the combustion gases flow, and the nozzle includes the engine component. The surface is a radially inward facing surface of the nozzle.

In accordance with one embodiment, a method of forming a protective coating on a substrate material includes the steps of: bringing the substrate material to a diffusion temperature, using an activator to form a vapor from an aluminum source, and exposing the substrate material to the vapor while the substrate is at the diffusion temperature. The activator includes an aluminum compound, and the vapor comprises aluminum from the aluminum source and from the activator. Aluminum diffuses into the substrate material to form an aluminide diffusion coating.

In one or more embodiments, the method includes a vapor phase aluminide process in which the substrate material does not contact the aluminum source.

In one or more embodiments, the substrate material comprises a refractory metal as the primary constituent.

In one or more embodiments, the refractory metal is niobium.

In one or more embodiments, the refractory metal is arranged in a lattice structure within the substrate material before the step of exposing, and atoms of the refractory metal are replaced by aluminum atoms in the lattice structure during the coating process.

In one or more embodiments, the aluminum compound is aluminum trifluoride.

In one or more embodiments, the method includes the step of maintaining the substrate at a temperature of at least 1100° C. for at least 15 hours.

In one or more embodiments, the method includes the steps of forming a layer of alumina on the aluminide diffusion coating and disposing a ceramic-based thermal barrier coating on the layer of alumina.

In one or more embodiments, the method includes the step of roughening a surface of the substrate material before the step of exposing the substrate material to the vapor.

In accordance with one embodiment, a rocket engine includes a nozzle having a surface in direct contact with engine combustion gases during engine operation. The nozzle includes a substrate, a diffusion aluminide coating, a layer of alumina on the diffusion aluminide coating, and a ceramic-based thermal barrier coating over the layer of alumina. The substrate is formed from a substrate material having a composition in which the majority elemental constituent has a melting point greater than 2000° C., and the diffusion aluminide coating is formed on the substrate. The diffusion aluminide coating includes aluminum and intermetallic compounds. The aluminum is interdiffused with the substrate material, and each intermetallic compound includes aluminum and the majority elemental constituent of the substrate material. The ceramic-based thermal barrier coating defines at least a portion of the surface of the nozzle that is in direct contact with engine combustion gases during engine operation.

In one or more embodiments, the majority elemental constituent of the substrate material is niobium.

In one or more embodiments, the diffusion aluminide coating has a thickness of 50 micrometers or greater.

It is contemplated that any one or more of the above features may be combined with one another and/or with additional features disclosed hereafter, except where such features are incompatible.

BRIEF DESCRIPTION OF THE DRAWINGS

Embodiments of the invention will hereinafter be described in conjunction with the appended drawings, wherein like designations denote like elements, and wherein.

DETAILED DESCRIPTION

The coating system and methods described herein address multiple problems that are likely to be encountered with engine components, particularly in applications where the engine components are required to endure prolonged and/or multiple cycles of extreme heat flux. The coating system is useful to protect a refractory metal-based substrate material from high temperature oxidation and relies in part on a diffusion coating. Diffusion coating of refractory metals and refractory metal alloys is unconventional. Attempts to do so have been largely unsuccessful because their high density and stability at conventional diffusion temperatures make such materials difficult to diffuse with other elements. Additionally, conventional diffusion coating processes are conducted at temperatures very close to the melting temperature of the substrate material. But when the substrate material is a refractory metal, this is not easily accomplished and poses additional problems.

The diffusion coating process discussed below employs unusual temperatures, durations, activator composition, and/or substrate preparation, resulting in a diffusion coating layer thickness and composition not previously possible with refractory metals or alloys. The resulting diffusion coating can be paired with a ceramic-based thermal barrier coating (TBC) as part of a coating system that can successfully endure the extreme temperatures associated with direct and prolonged exposure to burning engine fuels, such as liquid hydrogen (LH2) rocket fuel, while preventing oxidation of the underlying refractory metal.

Figure 1:
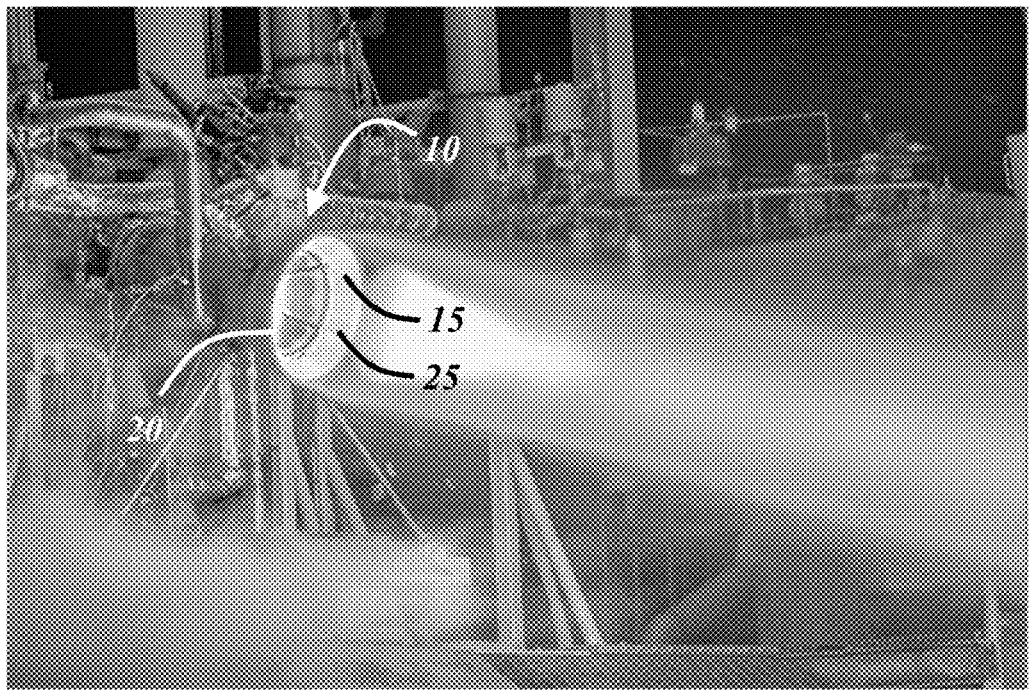
FIG. 1 is a photograph of an operating rocket engine that includes an embodiment of the coating system described herein.

FIG. 1 is a photographic image of a rocket engine 10 during testing. The engine 10 includes an embodiment of a coating system 15 located along an engine component 20, which is a rocket engine nozzle or thruster in this example. In particular, the coating system 15 is located along a surface 25 of the nozzle 20 that is in direct contact with engine combustion gases during engine operation, which in this case is a radially inward facing surface.

Figure 2:
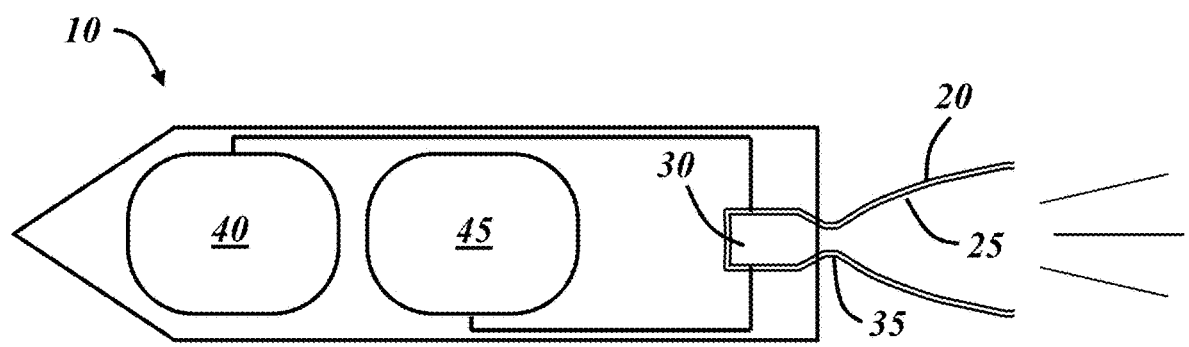
FIG. 2 is a schematic side view of a rocket engine showing various engine components with which the coating system can be used.

FIG. 2 is a schematic view of a typical rocket engine 10, which includes the nozzle 20, a combustion chamber 30, and a throat 35 connecting the combustion chamber and throat. Fuel from a fuel source 40 is combined with an oxidizer from an oxidizer source 45 and burned in the combustion chamber 30. Combustion gases pass through the throat 35 to the nozzle 20, which is shaped to expand and accelerate the combustion gases that leave the nozzle at hypersonic velocities. Combustion temperatures can be greater than 3000° C., which is higher than the melting point of even some refractory metals. While presented in the context of the nozzle 20 of a rocket engine 10, the coating system 15 is applicable to other surfaces of the rocket engine 10, such as internal surfaces of the combustion chamber 30 or throat 35, and to surfaces of other types of combustion engines.

Figure 3:
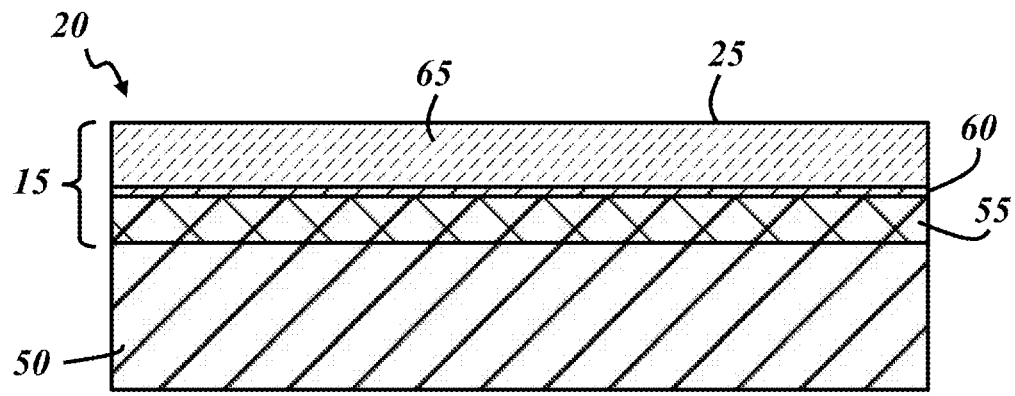
FIG. 3 is a schematic cross-sectional view of an example of the coating system on a substrate.

FIG. 3 is a schematic cross-sectional view of a portion of the engine component 20 including an example of the coating system 15 that defines at least a portion of the external surface 25. The engine component 20 includes an engine component substrate 50, such as a nozzle substrate, and the coating system 15. The illustrated coating system 15 includes a diffusion coating layer 55, a thermally grown oxide (TGO) layer 60, and a thermal barrier coating (TBC) 65. The relative layer thicknesses are not necessarily to scale. In a particular embodiment, the substrate 50 is formed from a substrate material in which the primary constituent is a refractory metal, the diffusion coating layer is a diffusion aluminide coating applied in a vapor phase aluminide (VPA) process, and the TBC is a ceramic-based coating such as yttrium-stabilized zirconium (YSZ). The coating system 15 is adapted to thermally insulate metal-based engine component substrates, protecting them from high temperature oxidation, and may withstand temperatures exceeding 3,000° C.

The substrate 50 is formed from the substrate material and provides the overall shape and structure of the engine component 20. The substrate material may include a refractory metal. For purposes of this disclosure, a refractory metal is any metallic element from the periodic table of elements having a melting temperature greater than 2000° C. Some examples of refractory metals include niobium (a.k.a. columbium), molybdenum, tantalum, tungsten, and rhenium. The refractory metal may be the primary constituent, the majority constituent, or substantially the only constituent of the substrate material. A primary constituent is the single largest constituent of the substrate material, and a majority constituent makes up more than 50% of the substrate material composition. When the refractory metal is substantially the only constituent, other trace elements may be present. In some embodiments, niobium is the refractory metal. In some embodiments, the substrate material is a refractory metal alloy, such as a niobium alloy. One suitable niobium alloy is C-103 niobium alloy.

The illustrated coating system 15 includes a diffusion coating 55 and an overlay coating 65. The diffusion coating is a coating in which one or more coating constituents are diffused into or interdiffused with the underlying material onto which it is coated, such as the substrate 50. Diffusion coatings are generally formed by exposing a surface of the substrate material to the coating constituents at an elevated diffusion temperature and allowing the coating constituents to diffuse into the substrate material. The diffusion coating may not add substantial thickness to the coated component in many cases. The diffusion coating is generally named for the element with which the substrate surface is enriched. By way of example, a chromide coating includes a layer of material that is more chromium-rich than the underlying material and further includes the constituent elements of the underlying material, due to the interdiffusion. Similarly, an aluminide coating includes a layer of material that is more aluminum-rich than the underlying material. Multiple diffusion coatings may exist together at the surface of a component. The thickness of the diffusion coating is defined by the depth to which the coating constituents diffuse and penetrate into the substrate. By contrast, an overlay coating, such as the illustrated TBC layer 65, is a distinct layer of material lying on top of the material being coated.

In the illustrated coating system 15, the diffusion layer 55 serves to protect the underlying substrate material from high temperature oxidation. For example, elements such as aluminum or chromium in the diffusion coating layer 55 can form a thin protective oxide layer, illustrated here as the TGO layer 60, during high temperature operation and exposure to oxygen, effectively forming an oxygen barrier between the substrate material and the exterior surface 25 of the engine component 20. This allows for the use of the ceramic-based TBC layer 65 at the outer surface 25 of the component. This ceramic-based layer 65 has a very low thermal conductivity with a melting point much greater than metallic materials and serves to slow or prevent the extreme heat of the burning combustion gases from being thermally conducted to the substrate material. However, the high porosity of ceramic-based materials will allow oxygen and other combustion gases to permeate through the TBC layer. The multiple layers of the coating system 15 thus work together to allow the engine component to operate in an environment in which it is exposed to temperatures above the melting point of the substrate without oxidizing the substrate material.

Figure 4:
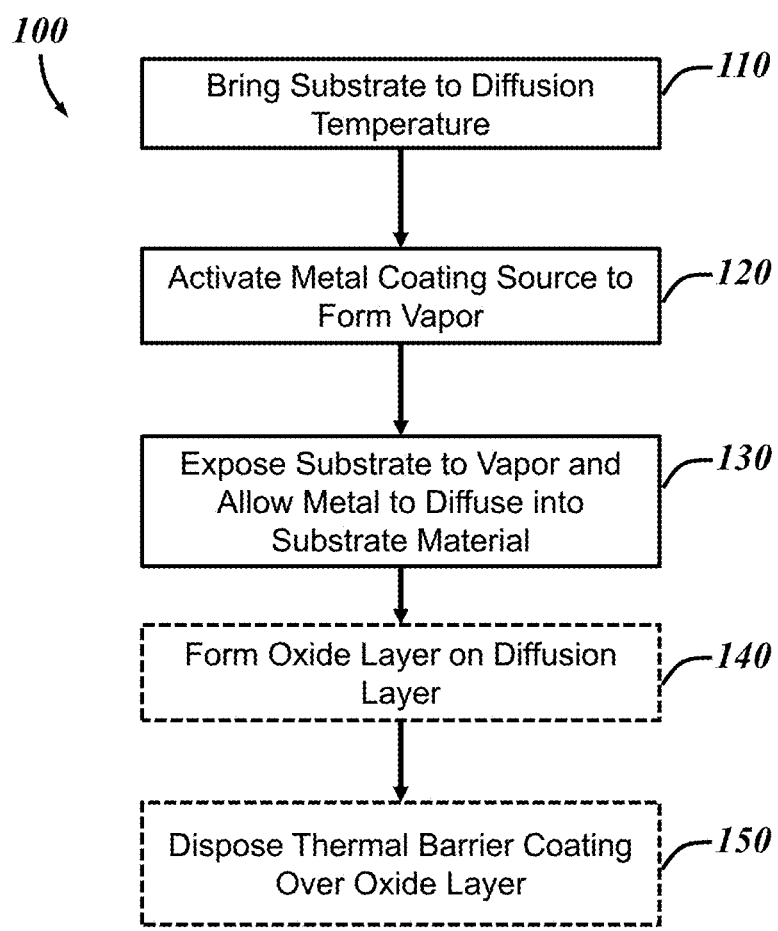
FIG. 4 is a process flow chart illustrating an exemplary method of applying the coating system.

An exemplary method 100 of applying the coating system of FIG. 3 is illustrated in FIG. 4 and includes the steps of bringing the substrate to a diffusion temperature (step 110), activating a metal coating source to form a vapor (step 120), and exposing the substrate to the vapor and allowing the metal to diffuse into the substrate material (step 130). The illustrated process further includes forming the thermally grown oxide layer (step 140) after the diffusion coating process is complete, and then disposing the thermal barrier coating over the TGO layer (step 150). The TGO and TBC forming steps are illustrated as optional because, while necessary to form the coating system 15 illustrated in FIG. 3, skilled artisans may find other uses for diffusion coating refractory metals without the need for additional coating layers now that the present disclosure makes such diffusion coatings possible.

In some embodiments, the surface of the substrate to be coated may be roughened prior to application of the coating system. In one embodiment, the step of roughening includes aggressively grit blasting the desired surface. The blasting media may be sized equivalent to a 54 mesh or other suitable size. This step can increase the surface area of the substrate and the resulting coatings and enhance the adhesion of the TBC. Because the material that forms the diffusion coating layer is primarily inwardly diffused into the substrate material and adds very little, if any, material to the substrate surface, a roughened substrate surface translates to a roughened diffusion coating layer of substantially the same shape. Also, in embodiments where employed, the TGO layer is very thin and has no substantial effect on the underlying surface geometry. A substrate surface that is roughened before applying the diffusion coating layer thus presents a coated surface with substantially the same surface roughness even after the diffusion coating layer and TGO are formed and provides enhanced adhesion of the subsequently applied TBC layer.

The step 120 of activating the metal coating source may include use of an activator that is a compound of the metal of the coating source. In one embodiment, the metal of the metal coating source is aluminum, and the activator is an aluminum compound. In particular, the aluminum compound may be aluminum trifluoride or another aluminum halide. The vapor thus formed includes aluminum both from the aluminum coating source metal and from the activator material itself. This is unconventional in diffusion coating processes, which typically use ammonium halides as activators of the metal coating source. The metal coating source and the activator material may be combined in a powder or particulate bed of solid material inside a coating chamber with the substrate to be coated. Upon heating the chamber to the diffusion temperature, the activator sublimes then reacts with the metal coating source to form the vapor to which the substrate is exposed.

In one embodiment, this vapor phase coating process is characterized by the substrate being separate from the coating source material—i.e., the metal coating source, such as aluminum, is not in contact with the substrate during the process as it may be in some other diffusion coating processes such as slurry coating or pack cementation processes. A non-contact vapor phase process may also be characterized by the ability to diffusion coat surfaces of the substrate that are not directly accessible via line-of-sight, such as internal surfaces of a partly hollow substrate or surfaces of the substrate facing away from the vapor source. It is contemplated that skilled artisans who now have knowledge of unconventional activator materials may employ them in such contact-coating processes. These teachings are also not limited to aluminide coatings. In some embodiments, the metal coating source is chromium and the activator is a chromium compound with the vapor depositing a chromide coating on the substrate.

Exposure of the substrate to the vapor may be performed at unconventional temperatures and durations as well. As noted above, conventional diffusion coating processes typically occur near the melting point of the substrate material, where the diffusion temperature is maintained for only a few hours. In embodiments of the presently disclosed process, the diffusion temperature is greater than 1100° C., and the substrate is exposed to the vapor at this temperature for a duration of 15 hours or more, and up to 20 hours or more. These process variables may be different, depending on the substrate material, coating material, and/or desired coating composition or thickness. Exposure to a coating vapor for such a long period of time at such a high temperature would render most other non-refractory metal substrate materials, even high-temperature Ni/Co-based superalloys, worthless by over-saturating the surface with the coating material (e.g., aluminum) and embrittling the material by converting it almost entirely to intermetallic compounds.

Figure 5:
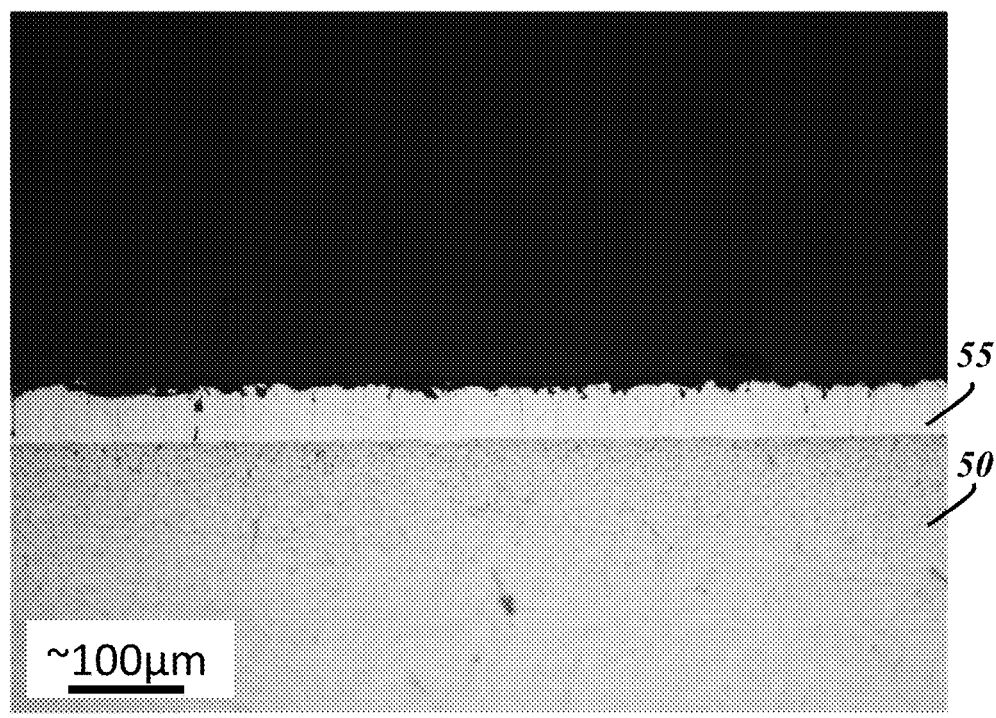
FIG. 5 is a photomicrograph of a cross-section of a refractory metal alloy with an aluminide diffusion coating.

Diffusion aluminide coatings have been successfully formed on refractory metal alloy substrates using the above-described activators and process parameters, with the diffusion temperature being more than 1000° C. lower than the melting temperature of the substrate material. In some cases, the diffusion coating can reach a thickness of 50 µm or more. Diffusion coating thicknesses, including aluminide coating thicknesses, may range from 5 µm to 75 µm, which was not believed possible before now. The photomicrograph of FIG. 5 is a cross-sectional view of a niobium alloy substrate 50 with a diffusion aluminide coating layer 55 having a thickness of about 45 µm which was formed according to the above-described process. In one embodiment, the diffusion coating thickness is in a range from 35 µm to 65 µm (0.0014" to 0.025").

The diffusion coating layer may include intermetallic compounds made up of the refractory metal and the metal coating material. For example, where aluminum is the diffusion coating material and the refractory metal is a niobium alloy, the diffusion coating layer may include NbAl, $NbAl_2$, and/or $NbAl_3$ in addition to aluminum atoms lodged in interstitial spaces within and between the crystal lattice structures of the refractory metal. The process may result in atomic replacement in the lattice structure, with the uncoated substrate material having the refractory metal in a lattice structure and aluminum atoms replacing removed individual refractory metal atoms within the lattice structure during the coating process.

The step of forming the TGO layer (step 140) may be performed during a pre-heating step for the subsequent application of the TBC layer. For example, the diffusion coated substrate may be brought to a temperature of about 1100° C. and held in the presence of oxygen for about 1 to 4 hours to form the oxide layer. In one embodiment, the TGO layer is alumina, formed by oxidizing aluminum in the exposed diffusion aluminide layer. Other oxides can be formed where other metals are part of the diffusion coating. It is useful to pre-form the TGO layer in this manner, prior to applying the TBC layer, rather than allowing the TGO layer to be naturally formed during subsequent engine operation after the engine component is assembled into an engine. If the oxide layer is not pre-formed as described here, it may form on its own beneath the TBC layer and cause cracking or spalling of the TBC layer.

Formation of the TGO layer directly on a diffusion coating is unconventional as well. For instance, in known processes in which a TBC is applied over a Ni/Co-based superalloy, a metal bond coat such as MCrAlY is typically pre-applied as an overlay coating on the substrate material. But these types of bond coats are porous and prone to oxidation, particularly at the extreme temperatures in which refractory metals are useful. Such a metal bond coat would also tend to smooth a previously roughened substrate surface and negate any additional effect the roughened substrate surface may have on TBC adhesion. Embodiments of the coating systems disclosed herein may be formed without such a bond coat or any other type of overlay coating between the substrate and the TGO layer.

Figure 6:
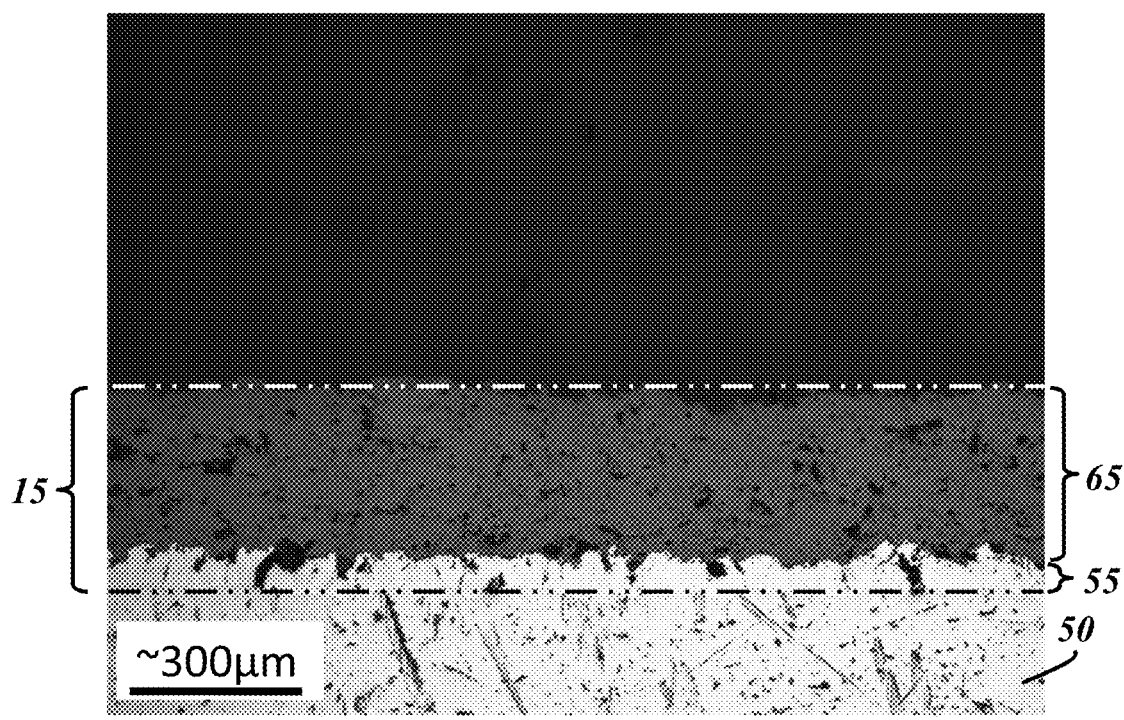
FIG. 6 is a photomicrograph of a cross-section of the refractory metal alloy of FIG. 5 with a thermal barrier coating applied over the aluminide diffusion coating.

The step of applying the TBC layer (step 150) can be performed after the TGO layer is formed. A ceramic-based TBC layer can be applied directly to the pre-formed TGO layer by conventional means, such as air-plasma spraying. The TBC layer may have a thickness in a range from 200 μm to 300 μm, or from 250 μm to 500 μm (0.010" to 0.020") in some embodiments. The photomicrograph of FIG. 6 is a cross-sectional view of a niobium alloy substrate 50 with a diffusion aluminide coating layer 55, similar to FIG. 5, with the TBC layer 65 formed thereover. The thickness of the TBC layer 65 in this example is about 300 μm. Phantom lines are added to FIG. 6 to illustrate the approximate locations of coating boundaries because they are difficult to see in the grayscale images. The location of the outer surface of the TBC layer 65 is approximated via a white phantom line, and the location of the inner boundary of the diffusion coating layer 55 is approximated via a black phantom line.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An engine component having a surface in direct contact with engine combustion gases during engine operation, the engine component comprising:
   a substrate formed from a substrate material comprising a refractory metal as the primary constituent; and
   a coating system comprising a diffusion aluminide coating formed on the substrate, the diffusion aluminide coating comprising aluminum interdiffused with the substrate material,
   the coating system defining at least a portion of the surface in direct contact with engine combustion gases during engine operation,
   wherein the diffusion aluminide coating includes at least two of the following intermetallic compounds: RAl, $RAl_2$ and $RAl_3$, where R is the refractory metal.

2. An engine component as defined in claim 1, wherein the refractory metal is niobium.

3. The engine component of claim 2, wherein the substrate material comprises 89% niobium, 10% hafnium, and 1% titanium.

4. An engine component as defined in claim 1, wherein the diffusion aluminide coating has a thickness of 50 micrometers or greater.

5. A rocket engine comprising the engine component of claim 1 in the form of a nozzle through which the combustion gases flow, wherein the diffusion aluminide coating and a ceramic-based thermal barrier coating disposed over the diffusion aluminide coating are present along an entire radially inward facing surface of the nozzle such that the thermal barrier coating is in direct contact with the combustion gases along the entire radially inward facing surface of the nozzle.

6. The engine component of claim 1, wherein the diffusion aluminide coating includes all of said intermetallic compounds.

7. The engine component of claim 1, wherein the diffusion aluminide coating defines said at least a portion of the surface in direct contact with engine combustion gases during engine operation.

8. The engine component of claim 1, further comprising a ceramic-based thermal barrier coating disposed over the diffusion aluminide coating, the thermal barrier coating defining said at least a portion of the surface in direct contact with engine combustion gases during engine operation.

9. A rocket engine comprising the engine component of claim 1, wherein said at least a portion of the surface in direct contact with engine combustion gases during engine operation is a surface of at least one of the following: a nozzle of the rocket engine, a combustion chamber of the rocket engine, or a throat of the rocket engine.

10. The rocket engine of claim 9, wherein said at least a portion of the surface in direct contact with engine combustion gases during engine operation is a surface of at least two of: the nozzle, the combustion chamber, or the throat.

11. The rocket engine of claim 10, further comprising a ceramic-based thermal barrier coating disposed over the diffusion aluminide coating at said at least a portion of the surface in direct contact with engine combustion gases during engine operation.

12. A method of forming a protective coating on a substrate material, the method comprising the steps of:
- providing a bed of solid particulate material comprising a combination of solid aluminum metal and a solid aluminum halide activator;
- bringing a coating chamber to a diffusion temperature with the substrate material and the bed of particulate material inside the chamber, wherein the aluminum halide activator sublimes and reacts with the aluminum metal in the bed of particulate material to form a vapor comprising aluminum from the aluminum metal in addition to aluminum from the aluminum halide activator,
- whereby aluminum from said vapor diffuses into the substrate material to form an aluminide diffusion coating,
- wherein the method is a non-contact vapor phase aluminide process in which the substrate material does not contact the solid aluminum metal or the solid aluminum halide activator in the bed of particulate material.

13. The method of claim 12, wherein the substrate material comprises a refractory metal as the primary constituent.

14. The method of claim 13, wherein the refractory metal is niobium.

15. The method of claim 12, wherein the aluminum halide is aluminum trifluoride.

16. The method of claim 12, further comprising the step of maintaining the substrate material at a temperature of at least 1100° C. for at least 15 hours.

17. The method of claim 12, further comprising the steps:
- forming a layer of alumina on the aluminide diffusion coating; and
- disposing a ceramic-based thermal barrier coating on the layer of alumina.

18. The method of claim 12, further comprising the step of roughening a surface of the substrate material before forming the aluminide diffusion coating.

19. The method of claim 12, further comprising the step of forming at least two of the following intermetallic compounds in the aluminide diffusion coating: $RAl$, $RAl_2$ and $RAl_3$, where R is a refractory metal.

20. A rocket engine, comprising:
- a combustion chamber configured to burn fuel from a fuel source to produce combustion gases;
- a nozzle shaped to expand and accelerate the combustion gases;
- a throat through which the combustion gases pass from the combustion chamber to the nozzle,
- wherein each of the combustion chamber, nozzle, and throat is formed from a substrate material comprising 89% niobium, 10% hafnium, and 1% titanium; and
- a coating system disposed over a surface of at least two of: the combustion chamber, the nozzle, and the throat,
- wherein the coating system comprises an inwardly diffused aluminide coating having a thickness of at least 50 microns and includes the following intermetallic compounds: $NbAl$, $NbAl_2$, and $NbAl_3$, the coating system further comprising a ceramic-based thermal barrier coating disposed over the aluminide coating and a thermally grown oxide layer disposed between the aluminide coating and the thermal barrier coating, and
- wherein the coating system is in direct contact with the combustion gases during engine operation at said at least two of: the combustion chamber, the nozzle, and the throat.

* * * * *